No. 757,821.

Patented April 19, 1904.

UNITED STATES PATENT OFFICE.

ALEXANDER THOMSON MACFARLANE, OF ROCHESTER, ENGLAND.

BASIC REFRACTORY MATERIAL.

SPECIFICATION forming part of Letters Patent No. 757,821, dated April 19, 1904.

Application filed May 10, 1902. Serial No. 106,759. (No specimens.)

*To all whom it may concern:*

Be it known that I, ALEXANDER THOMSON MACFARLANE, engineer, a subject of the King of Great Britain, residing at Wickham Engine Works, Rochester, in the county of Kent, England, have invented certain new and useful Improvements in and Relating to Refractory Material, of which the following is a specification.

This invention relates to basic refractory materials, and has reference more particularly to the production of a material which can be used as a furnace-lining and will withstand the highest temperatures, as well as repeated changes of temperature and exposure to the air, without any liability to crack or crumble and disintegrate.

An important feature of the invention consists in the employment of Portland cement in the special and distinctive manner hereinafter set forth to form the refractory material.

A further important feature consists in the employment with such Portland cement of a binding or setting agent or medium distinct from any which are used in the ordinary way to cause cement to set, such medium being of a non-hydrating kind which will not wet or slake the anhydrous or dry cement and may be, for example, tar or tar residues in a practically anhydrous condition, it being important to the successful carrying out of the invention that all moisture should be as far as possible excluded both from the cement and also from the binding medium.

When Portland cement is used in the ordinary way with the addition of water, the setting is due to the formation of hydrated crystals which bind themselves together, and so give coherence and strength to the mass. If, however, Portland cement were used in this way as a refractory material, the crystals would under the action of the heat be broken up and their coherence would be destroyed, so that the whole mass would lose its hard character and would break up and disintegrate in such a way that it would be absolutely useless as a furnace-lining. This has actually been proved to occur in practice. Now I have discovered that by incorporating with the cement while in the raw and anhydrous state a small percentage of tar or other non-hydrating binding material the whole mass can be brought into a plastic condition, which can, as desired, be formed into bricks, blocks, or slabs and be burned in a kiln like ordinary fire-bricks or may be applied directly in the plastic state to the interior of the furnace to form the lining thereof. I have further discovered that in the burning operation and even when the mass is submitted to the highest possible temperatures the tarry binding medium is not volatilized or burned away, but appears to enter into a combination with the cement, as it were, forming a hard black stony mass, with a close gritty fracture, which is absolutely unaffected by any heat or by changes of temperature or exposure to the air.

I am aware that dolomite has long been used as the basis of a refractory material with a tarry binding medium; but it is well known that such material after burning crumbles and disintegrates when again exposed to the atmosphere, thereby frequently causing serious damage and inconvenience, and it is the one object of my invention to obviate this disadvantage by the substitution of my improved refractory material for the purposes for which the dolomite has been hitherto employed.

In carrying out the invention the Portland cement is first rendered perfectly free from moisture in any suitable way, and to it is added, say, from five to ten per cent. of its weight of the binding medium above referred to, which must also be in a practically anhydrous state or contain only so much water as may be necessary to render it adhesive without wetting or slaking the cement. This may conveniently consist of what are known as "tar residues"—that is to say, the heavier and less volatile matters left by the boiling of ordinary gas-tar or of starch with a small quantity of water to render it able to act as a binder. The mixture may be conveniently effected in a pug-mill or other suitable kneading apparatus, and, if desired, the cement may be used in a heated state, so as to facilitate the incorporation of the binding medium with it. As soon as the mass is brought into a uniform plastic condition it may be formed into bricks or blocks, as described, or it may be applied in the manner referred to direct to the interior of the furnace and be subjected *in situ* to the action of the heat. When used in this way, it acts perfectly as a basic refractory lining and is much more resistant to the scouring and corroding action of the slags than are the linings at present in use. The material may, however, equally well be applied to the construction of fireproof floors for buildings and for various other purposes where a hard permanent refractory material is a desideratum.

What I claim, and desire to secure by Letters Patent of the United States, is—

1. The method of making a refractory material from Portland cement, consisting in mixing cement, in an anhydrous state, with a binding medium and then burning the same, substantially as described.

2. The method of producing a refractory material from Portland cement which consists in mixing said cement with a non-hydrating binding medium, and then burning the same, substantially as described.

3. The method of producing a refractory material from Portland cement and tarry matter, consisting in rendering the cement and tar anhydrous, mixing them together, and then burning them, substantially as described.

4. The method of making a refractory material from Portland or hydraulic cement, consisting in mixing such cement in a dry powdery state with a non-hydrating binding medium, compressing the whole and then burning the same, substantially as described.

5. A refractory material composed of anhydrous Portland or hydraulic cement and a non-hydrating binding medium burned together, substantially as described.

6. A refractory material consisting of a burned mixture of anhydrous Portland or hydraulic cement and tarry binding medium, substantially as described.

In testimony whereof I have hereunto set my hand, in presence of two subscribing witnesses, this 28th day of April, 1902.

ALEXANDER THOMSON MACFARLANE.

Witnesses:
    C. BARNARD BURDON,
    JOSEPH LAKE.